(12) United States Patent
Soo

(10) Patent No.: US 8,279,202 B2
(45) Date of Patent: Oct. 2, 2012

(54) METHODS OF MAKING AND USING AN APPARATUS FOR PROVIDING MULTI-TOUCH SENSING CAPABILITY USING AN LCD SCREEN WITHOUT AN EXTRA TOUCH SCREEN LAYER

(75) Inventor: David Soo, Fremont, CA (US)

(73) Assignee: Chrontel International Ltd., Hamilton (BM)

( * ) Notice: Subject to any disclaimer, the term of this patent is extended or adjusted under 35 U.S.C. 154(b) by 611 days.

(21) Appl. No.: 12/422,064

(22) Filed: Apr. 10, 2009

(65) Prior Publication Data
US 2010/0045635 A1    Feb. 25, 2010

Related U.S. Application Data

(60) Provisional application No. 61/091,654, filed on Aug. 25, 2008.

(51) Int. Cl.
*G06F 3/041* (2006.01)
(52) U.S. Cl. .................. 345/178; 178/18.03
(58) Field of Classification Search .......... 345/173–179; 178/18.01–18.09, 18.11, 19.01–19.07
See application file for complete search history.

(56) References Cited

U.S. PATENT DOCUMENTS

| | | | |
|---|---|---|---|
| 6,239,788 B1 * | 5/2001 | Nohno et al. | 345/173 |
| 6,961,015 B2 | 11/2005 | Gernahan et al. | 341/165 |
| 7,084,860 B1 | 8/2006 | Jaeger et al. | |
| 7,166,966 B2 | 1/2007 | Naughler, Jr. et al. | 341/165 |
| 2004/0189619 A1 * | 9/2004 | Yun | 345/179 |
| 2008/0062148 A1 | 3/2008 | Hotelling et al. | |

FOREIGN PATENT DOCUMENTS

| | | |
|---|---|---|
| CA | 1169172 | 6/1984 |
| CN | 1471072 | 1/2004 |
| WO | WO2007/003108 | 1/2007 |

OTHER PUBLICATIONS

International Search Report issued Nov. 16, 2009 in corresponding PCT/CA09/001167.

* cited by examiner

*Primary Examiner* — Stephen Sherman
(74) *Attorney, Agent, or Firm* — Pillsbury Winthrop Shaw Pittman LLP

(57) ABSTRACT

The present invention relates to methods of making and using and apparatus for providing touch screen capability using an LCD screen without an extra touch screen layer.

18 Claims, 10 Drawing Sheets

METHODS OF MAKING AND USING AN APPARATUS FOR PROVIDING MULTI-TOUCH SENSING CAPABILITY USING AN LCD SCREEN WITHOUT AN EXTRA TOUCH SCREEN LAYER

RELATED APPLICATIONS

This application claims the benefit of U.S. Provisional Patent Application Ser. No. 61/091654 filed Aug. 25, 2008, and is hereby incorporated by reference.

BACKGROUND

1. Field of the Invention

The present invention relates to methods of making and using an apparatus for providing multi-touch sensing capability using an LCD screen without an extra touch screen layer.

2. Background of the Invention

Liquid crystal displays, known as "LCDs", are used to create display screens and are widely used on a whole host of various electronic devices, including digital televisions, computer screens, mobile phone screens, and the like.

FIG. 1 illustrates an overview block diagram of a conventional LCD assembly 100 that does not include touch screen or TS capability. As illustrated, the LCD module 100 inputs graphics data 102 that correspond to the color of the pixels to be displayed on the LCD panel 140. The LCD module 100 also inputs DC power along line 101.

With respect to power, the low voltage DC power is typically input to a DC/DC converter of some type to provide higher voltage power to the various internal circuits, i.e. VGH and VGL to the gate driver circuits 150 and VDH and VDL to the source driver circuits 170 as illustrated. The input DC power is also directed to the display controller 130 and to an inverter circuit 120 that powers the backlight lamp 121 of the LCD module 100.

The display controller 130 processes the graphics data signals 102, outputs the timing and control signals to the gate driver integrated circuits 150 and the corresponding timing and pixel color information to the source driver integrated circuits 170.

One gate driver IC 150 is depicted in FIG. 2 and depending on the size and resolution of the LCD panel 140, multiple gate driver IC's can be used to match the panel's vertical resolution. A counter based decoder 152 sends out a single logic 1 signal to each high-voltage buffer 153 sequentially, which in turn drives a high-level voltage (VGH) into the corresponding row line 141 of the LCD panel 140. At the end of the clock period, the logic 1 signal is returned to logic 0 and the row line 141 voltage returns to a low-level voltage (VGL).

One source driver IC 170 is depicted in FIG. 3 and depending on the size and resolution of the LCD panel 140, multiple source driver IC's can be used to match the panel's horizontal resolution. An interface decoder 172 decodes the source driver interface signals 171 into multiple digital words, which represent the intensity of the primary colors of the pixels, and into timing information. These digital words are sent to the correct digital-to-analog converters 173, which output source (column) signals 174 via each of column lines 142 in the LCD panel 140. Source signals 174 are analog voltages between VDH and VDL. A common voltage, Vcom 149, is generated in the source driver IC 170 and is used to bias the common electrode 147 in FIG. 4(b). If Vcom 149 is 0V, then VDH is a positive voltage and VDL is a negative voltage.

FIG. 4(a) illustrates a simplified circuit view of a portion of the conventional LCD panel 140 that does not include touch capability. As shown, there exist the row lines 141, shown in this portion view as rows 141-1, 141-2 and 141-3, as well as column lines 142, shown in this portion view as columns 142-1R, 142-1G and 142-1B, with the RGB standing for red, green, blue respectively. Significant components included within each pixel location (corresponding to the intersection of a row line 141 and a column line 142) include a thin film transistor 143 (TFT), a storage capacitor 144. Other components, well known to one of ordinary skill in the art, are not included for description herein.

FIG. 4(b) illustrates an example of various layers that are used to fabricate an LCD panel 140. As shown, the LCD panel 140 includes a color filter substrate 146, a common electrode 147, and a thin film transistor substrate 148 that contains the plurality of row lines 141 and the plurality of column lines 142. The intersection of each of the row lines 141 and the column lines 142 corresponds to the corner of a pixel, thereby forming a plurality of pixels in a matrix. Each pixel includes one thin film transistor 143 which is coupled to one of the row lines 141 at its gate electrode, one of the column lines 142 at its source (drain), and to the pixel electrode 145 of the storage capacitor 144 at its drain (source). Other layers, well known, are also included though not necessary for description herein.

The operation of a LCD panel is similar to that of a sequentially accessed memory array. All TFT's 143 connected to one row line 141 are first turned on. Source signals 174 on the column lines 142 are transferred into the corresponding storage capacitors 144. After the transfer is competed, the TFT's connected to that row line 141 are then turned off by the gate signal 154. The display controller 130 then proceeds to program the next row until the entire panel is refreshed. The voltages on all storage capacitors are typically refreshed at 60 times per second, or at a sufficiently fast rate in order to allow the human eye to perceive a particular color though the blending of RGB at adjacent pixel locations corresponding to the intensity of the RGB components for those particular column line signals 142.

Various different methodologies are known and used in the conventional LCD module 100 to turn on the various pixel locations in a manner that maintains a perception of continuity, and also is energy efficient.

It is also known to add a touch screen capability to an LCD, thereby allowing for the screen to provide the function of displaying a variety of different visual images, as well as allowing for the same screen to provide the function of detecting a location on the screen that has been touched. A touch function can then allow a whole host of different functions, from pressing a button, drawing a line, to using a finger or pointing device as a cursor.

In the LCD's that have a touch screen, however, the manner in which both capabilities are provided is to have the certain layers (i.e. those that are used to make the LCD screen functionality) used only for generation of graphic images and to have different additional layers used to obtain the touch screen functionality. The major different types of touch screen technologies include touch sensing using a resistive network, a capacitive network, a current flow sensing circuit, a surface acoustic wave detection circuit, a near field imaging detection circuit, an infrared light detection circuit and a strain gauge detection circuit. In all of these implementations, there is an additional layer or layers used for touch sensing, which layer or layers is not used at all for the LCD display.

Advances in the capabilities of touch screen display panels have continued to occur, such that they are becoming widely used. Nevertheless, due to the additional layer or layers needed for touch screen functionality, conventional touch screens are necessarily thicker then a correspondingly similar conventional LCD panel that does not include touch functionality, and, due to the extra layer, lighting efficiency for the LCD is reduced. Furthermore, with the additional layer or layers come extra costs.

SUMMARY OF THE INVENTION

The present invention relates to methods of making and using and apparatus for providing multi-touch sensing capability using an LCD screen without an extra touch screen layer.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

Figure 1:
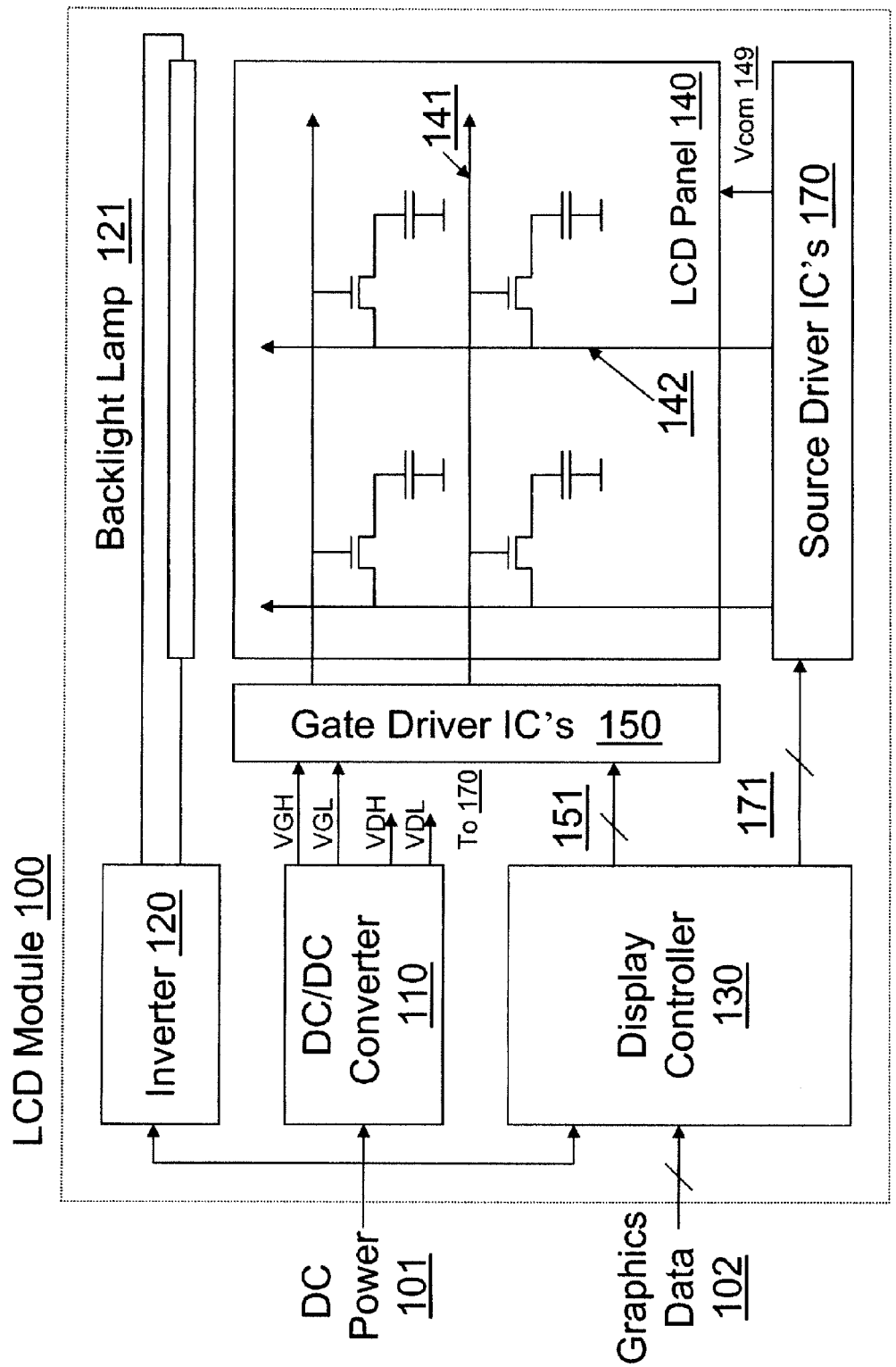
FIG. 1 illustrates an overview block diagram of a conventional LCD panel and control circuitry that does not include touch capability.

Since this invention allows the use of a conventional LCD panel 140 in FIG. 1 to perform touch screen function, many of the circuit blocks of the preferred embodiments of this invention as described in FIG. 5 to 8 remained the same or unchanged from the same circuit blocks of the conventional LCD module 100 described in FIG. 1 to 4; in which case, the same item number is assigned to the same circuit block.

In order to simplify the figures of this patent, only the signal paths are shown. Power, ground, clock and control signals associated with that signal path are intentionally left out of the drawings.

DETAILED DESCRIPTION OF THE PREFERRED EMBODIMENTS

Introduction

Figure 4A:
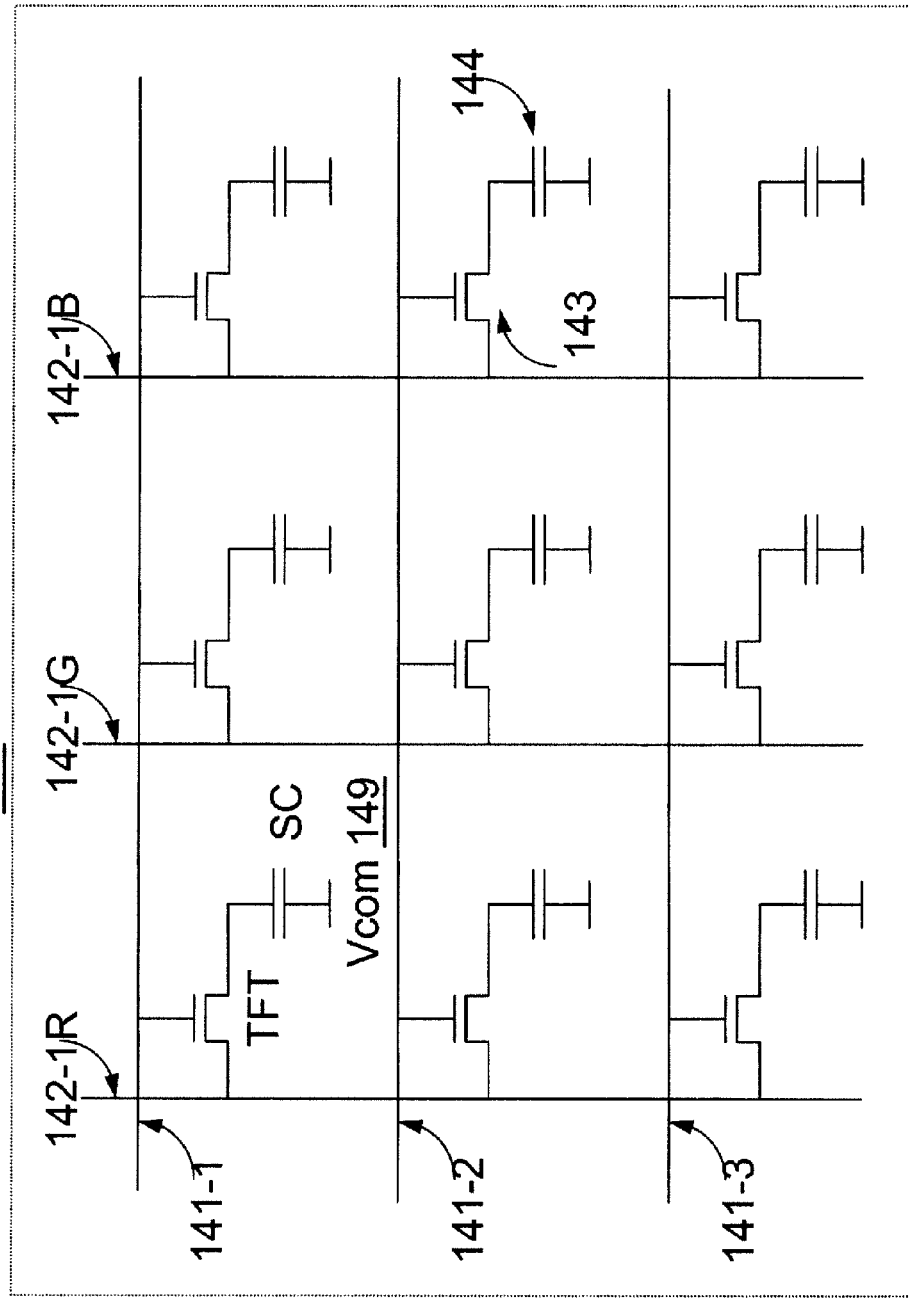
FIGS. 4(a) and 4(b) illustrate a simplified circuit view and layer view of a portion of a conventional LCD panel that does not include touch capability.

The present invention provides methods of making and using and apparatus for providing touch screen capability using an LCD screen without an extra touch screen layer or layers. As such, the following description will use the description of an LCD module 100 as provided above in FIGS. 1 to 4, and show the differences between that and the LCD/touch screen module 200 according to the present invention as shown in FIG. 5 to 8. In FIG. 5, the LCD panel 140 in the LCD/touch screen module 200 is essentially the same as that of the LCD module 100 previously described, as there are no additional layers required for touch screen functionality. It should be understood, however, that to the extent that there are different types of currently existing LCD panels, as well as LCD panels currently being developed, that such different types of LCD panels will not all have exactly the same layers in order to make the LCD screen. One of ordinary skill in the art will appreciate, however, that irrespective of the specific LCD implementation, that the teachings and principles described herein are applicable to different specific LCD implementations and can be used to implement an LCD/touch screen module 200 as described herein that does not include additional layers that are used for implementation of the touch functionality.

FIG. 5 illustrates an overview block diagram of an LCD/touch screen module 200 according to the present invention. As illustrated, the LCD/touch screen module 200 includes the LCD panel 140 as shown with respect to FIG. 1, and mentioned previously, as the row lines 141 and column lines 142 that are used within the LCD panel for transmitting the gate signals 154 and the source signals 174 for display purpose, respectively, are also used as explained hereinafter to transmit signals that are used for the touch sensing capability. As such, the circuit elements in the LCD/touch screen module 200 that connect to the LCD panel 140 have different functionality than that of the corresponding elements that connect to the LCD module 140 as used in the implementation previously described in FIG. 1.

Description of the Touch Screen Signal Path

Comparing FIG. 1 to FIG. 5, the display/touch scene controller 230, the new gate driver IC's 250 and the new source driver IC's 270 are different from those in conventional approach as described in FIG. 1 as blocks 130, 150 and 170, respectively. Other blocks in FIG. 5, namely 110, 120, 121 and 140 are the same as those in FIG. 1.

Figure 6:
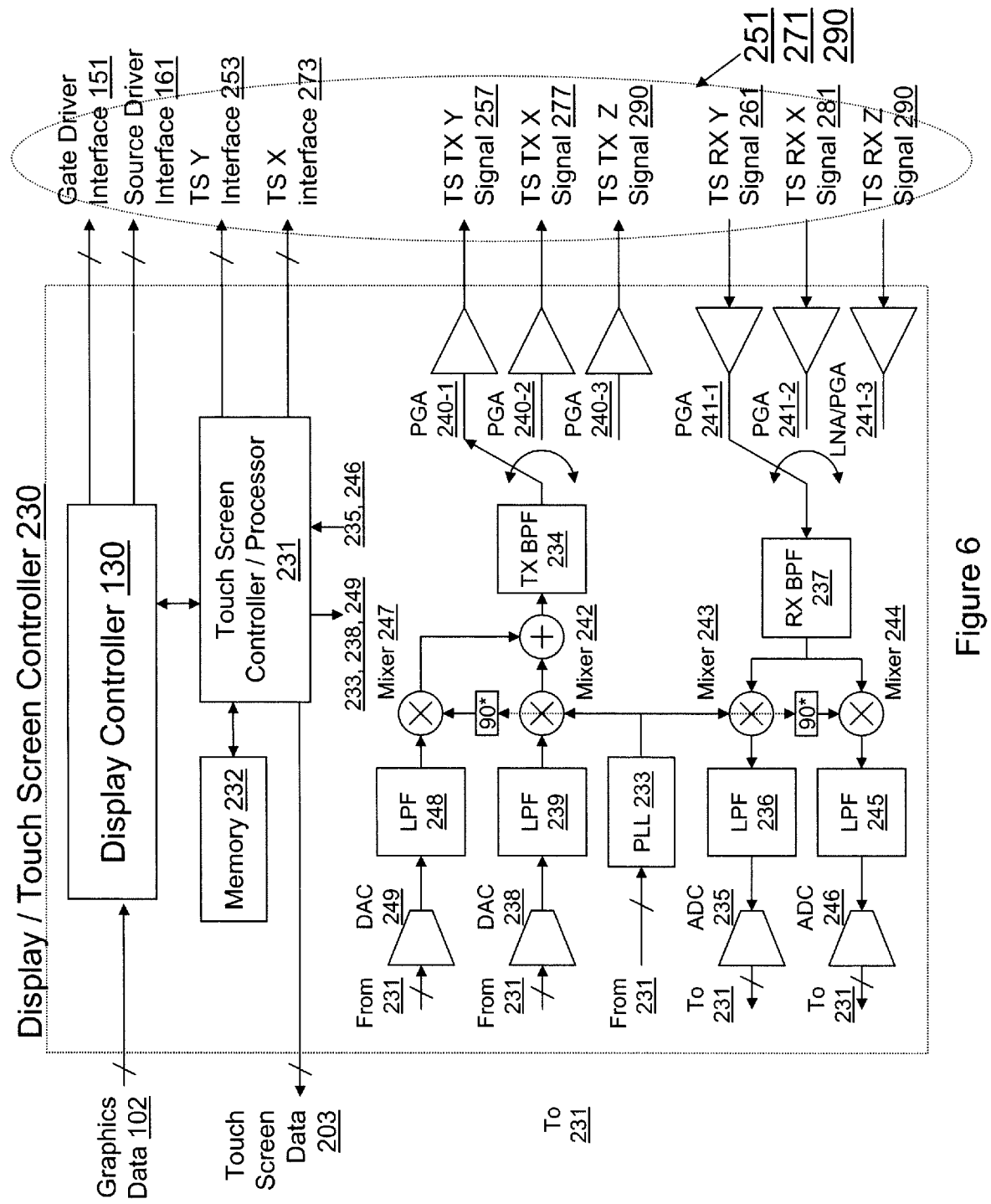
FIG. 6 illustrates a simplified block diagram of an integrated LCD/touch screen controller, according to the present invention.

Referring to FIG. 6, which shows a block diagram of the display/touch screen controller 230. Display controller 130 is the same as that in conventional approach, which is described in the background section of this patent. The remaining blocks in FIG. 6 are added to facilitate the touch screen function and are part of the preferred embodiment.

The touch screen controller/processor 231 and its associated memory 232 function as a programmable processor. Depending on the resolution of the touch screen and characteristics of the LCD panel, the computation speed of the processor 231, its touch screen algorithm and the size of its memory system would have to be adjusted accordingly. Memory 232 may include volatile memory, non-volatile memory and high-speed cache memory. Different touch screen algorithms will be discussed later. Besides executing the touch screen algorithm, the processor 231 also function as a controller to generate timing and control information for the touch screen circuitries embedded in the new gate and source driver IC's, identified as 250 and 270, respectively. These timing and control signals are depicted as TS Y interface 253 and TS X interface 273.

The remaining parts of FIG. 6 (item 233 to 240) describe a general-purpose radio transceiver. It is capable of transmitting and receiving different modulated RF signals including single carrier, amplitude modulated (AM), phase modulated (PM), frequency modulated (FM), direct sequence (DS), etc. By changing different firmware code in memory 232, processor 231 can execute different algorithms to generate different base-band signals according to the different modulation methods above and send this base-band signal to the input of the digital-to-analog converters (DAC) 238 and 249. Optional low pass filters 239 and 248 can be used as reconstruction filters for the DAC's. Two mixers arranged in phase quadrature and a programmable PLL 233 combination then modulate the base-band signal to the desired RF frequency. PLL 233 can be programmed by the touch screen controller 231 to produce a local oscillator frequency for the quadrature mixer circuit. One or more RF frequencies can be used to sense a touch event. An optional transmit band-pass filter, TX BPF 234, can be use to reduce unwanted harmonics in the RF signal. At this point, the filter RF signal is switched to the input of one of the three programmable gain amplifiers, PGA 240. Setting its gain controls the power of the transmitted RF signal. The RF signal is then send to either the gate driver IC 250 as TS TX Y signal 257, to the source driver IC 270 as TS TX X signal 277, or to an external connection as TS TX Z signal 290 coupled to the user's body. The remaining blocks in FIG. 6 are described hereinafter.

Figure 2:
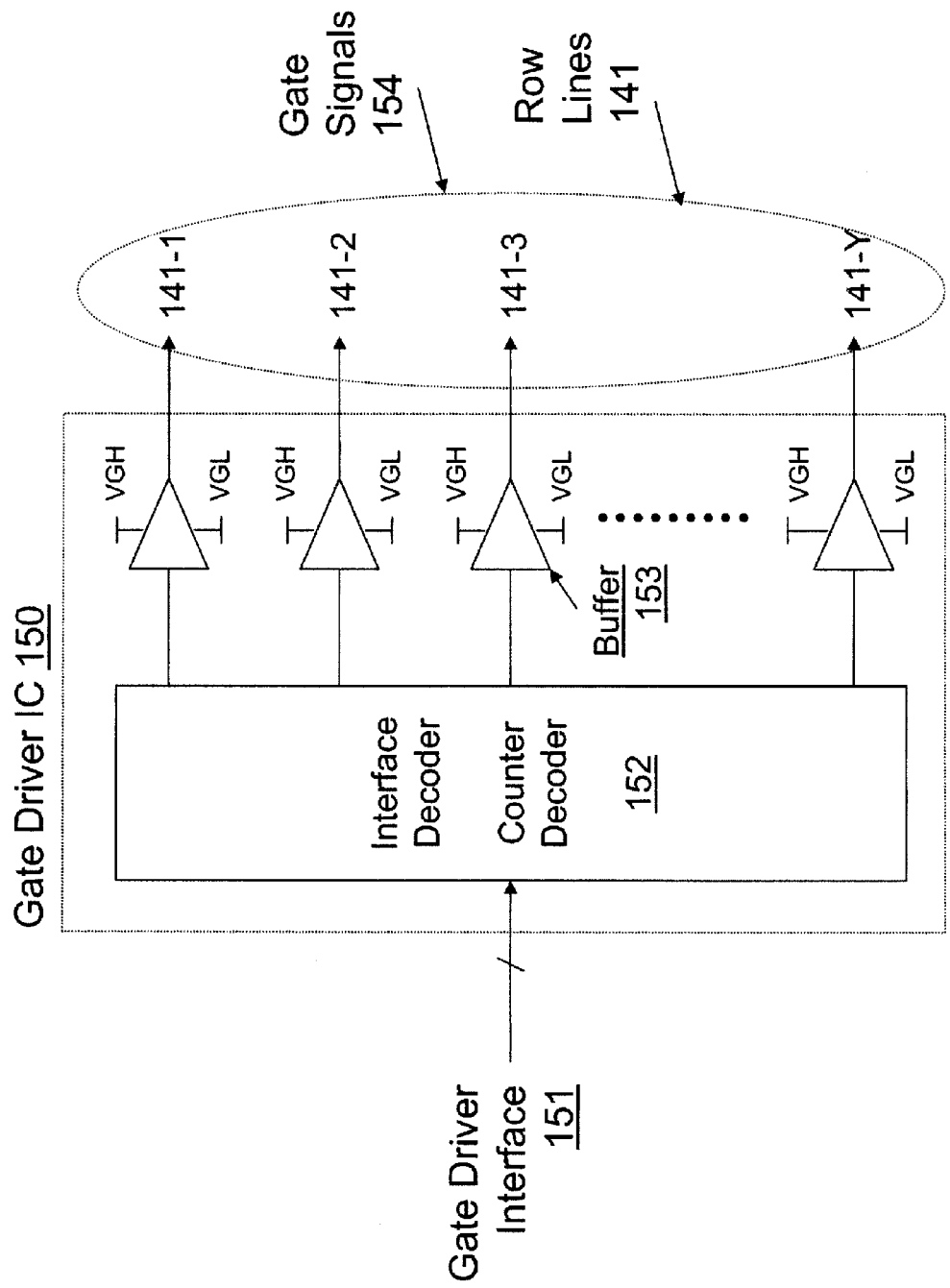
FIG. 2 illustrates a simplified block diagram of a typical gate driver integrated circuit.
Figure 3:
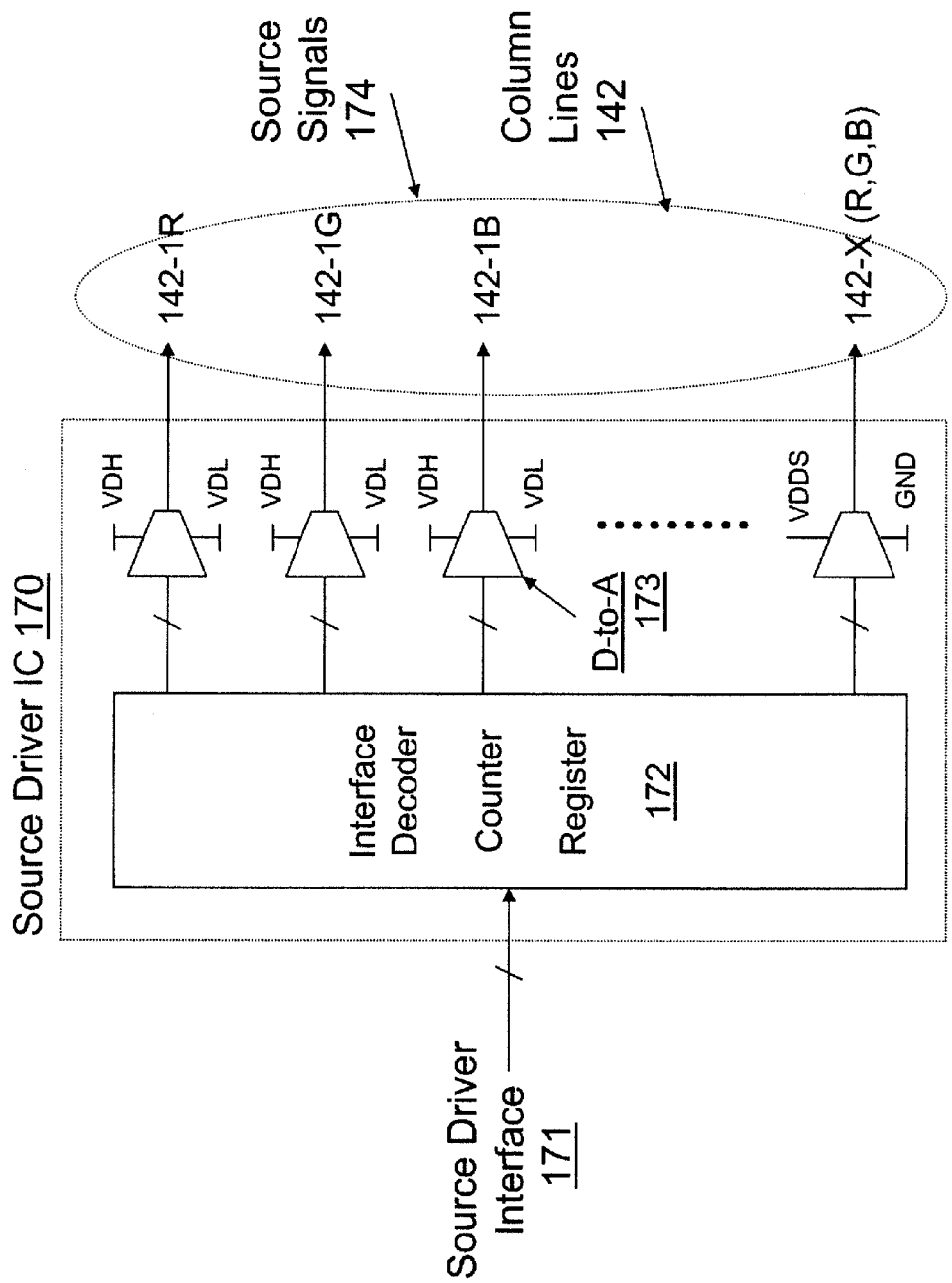
FIG. 3 illustrates a simplified the block diagram of a typical source driver integrated circuit.
Figure 7:
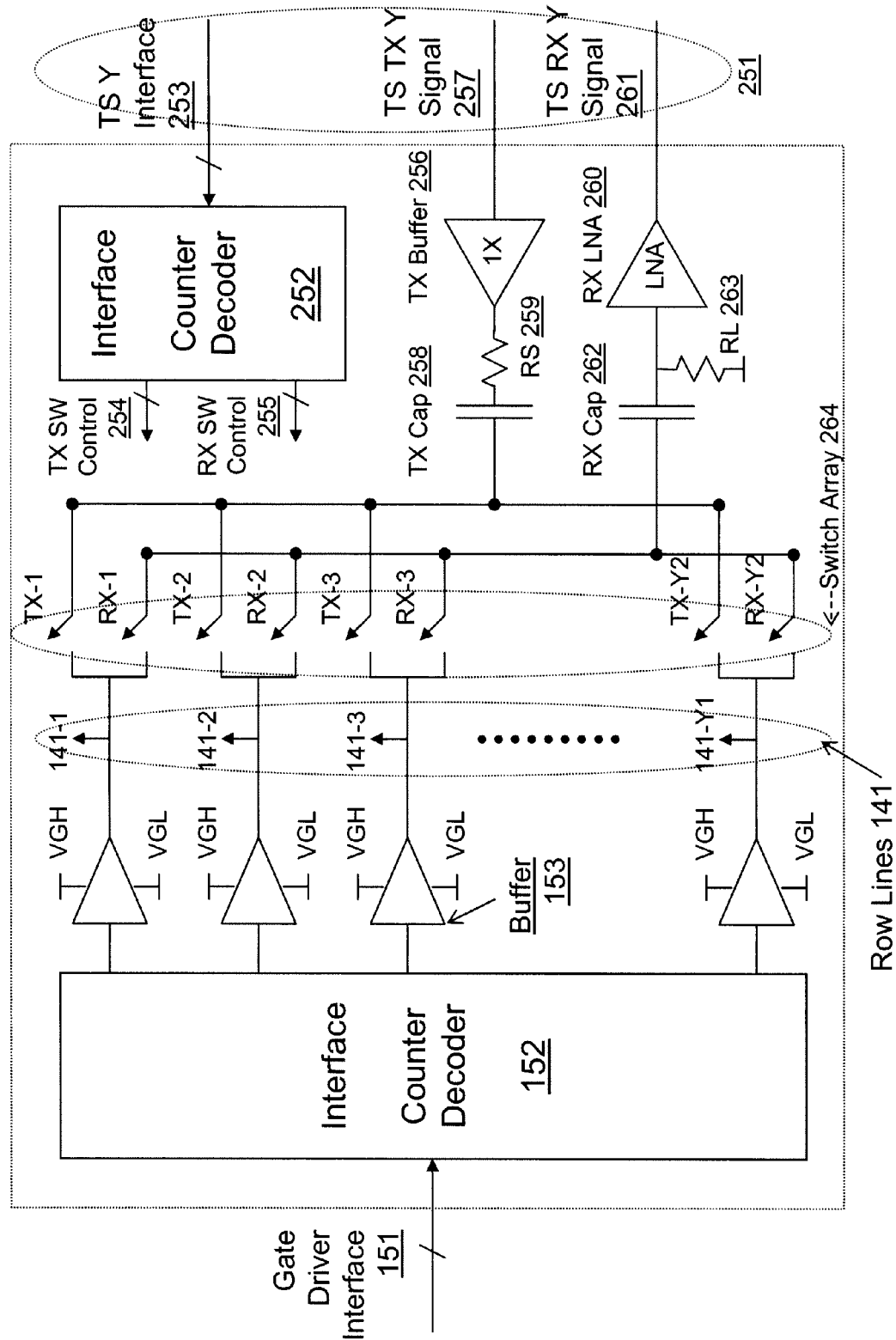
FIG. 7 illustrates a new gate driver IC where provisions for touch screen capability are included according to the present invention.
Figure 8:
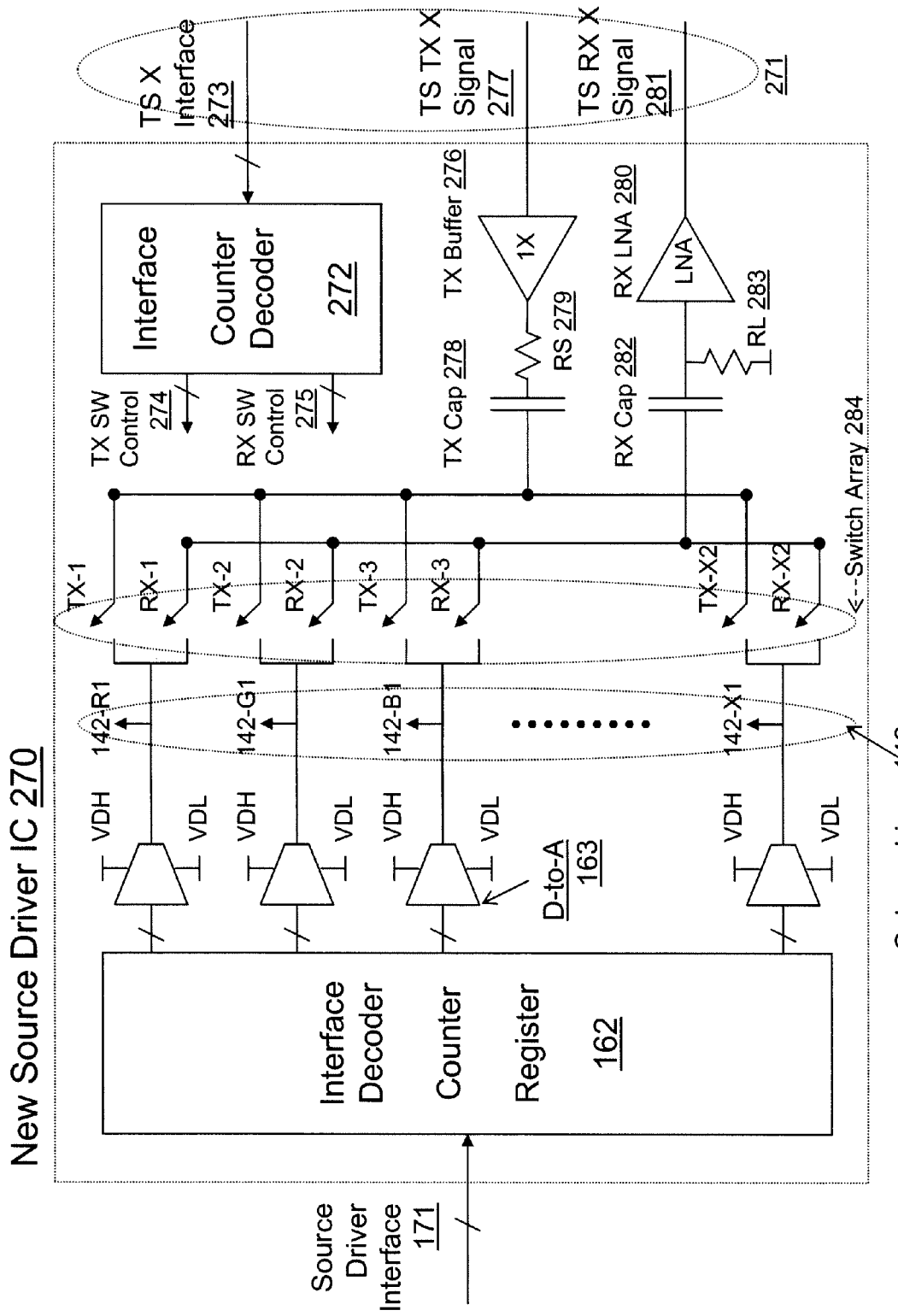
FIG. 8 illustrates a new source driver IC where provisions for touch screen capability are included according to the present invention.

Referring to FIG. 7, gate driver signal 151, interface/counter decoder 152 and high voltage buffers 153 remains unchanged from those in conventional gate driver IC's as depicted in FIG. 2. The remaining circuit blocks and signals (item 251 to 264) are additional integration to allow touch sensing function.

Interface/counter decoder 252 accepts timing and control information from touch screen controller 231 via TS Y interface 253 and generates control signals 254 and 255 to turn on one of the transmit switch TX-y and one of the receive switch RX-y+os where os is the address offset, within the switch array 264. When the address offset is zero, the transmitter and the receiver are operated on the same row line, 141-y. When the address offset is 10, for example, this means the transmitting row line 141-y is 10 pixels away (to the north) from the receiving row line 141-(y+10). The total number of TX and RX switch pairs (Y2) can be different from the total number of row lines (Y1). If the LCD panel vertical resolution is high compared to the touch screen vertical resolution then the ratio Y1/Y2 is greater than 1. In this preferred embodiment, Y1/Y2 equals to one for simplicity and the invention shall work equally well when Y1/Y2 is greater than one. Counter decoder addresses each pair of TX/RX switches sequentially according to instructions from touch screen controller 231 which uses the address information to interpret the location of the touch in the y direction.

An analog RF signal is received at the input of transmit buffer, TX Buffer 256, as TS TX Y Signal 257. TX Buffer 256 is a wideband unity gain buffer with enough bandwidth covering the interested frequencies. The effective output resistance of TX buffer is represented by RS 259. RF signal is then AC coupled into the row line 141-y through transmit capacitor, TX Cap 258, and switch TX-y. The DC voltage of row line 141-y should be held low at VGL during the transmission of the RF touch screen test signal thus an AC coupled network must be used to interface to the row line. The RF test signal appearing on the row line should be small such that the TFT's on that row are not turned on causing adverse effect on the displayed image. Resistor RS 259, capacitor TX Cap 258, switch TX-y's on resistance and the effective output impedances of buffer 153 form an interface network to the row line 141. In other embodiments, a more complicated two-port passive network (AC coupled) can be used to improve transmission characteristics by matching the effective source impedance to that of the antenna's, in this case, the row line.

Figure 4B:
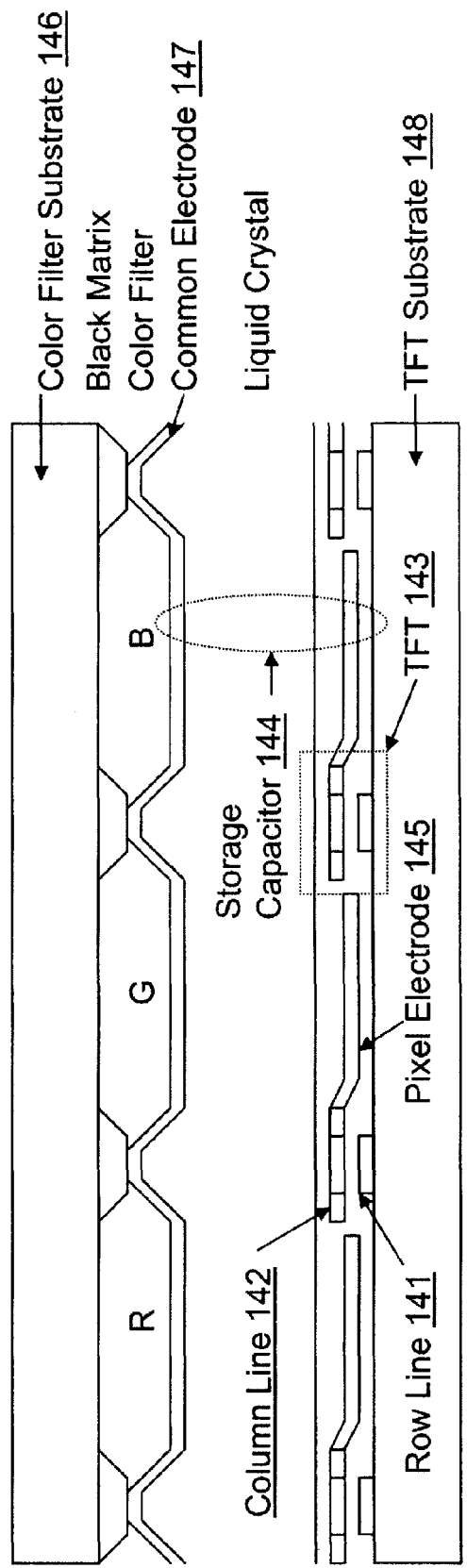
Figure 5:
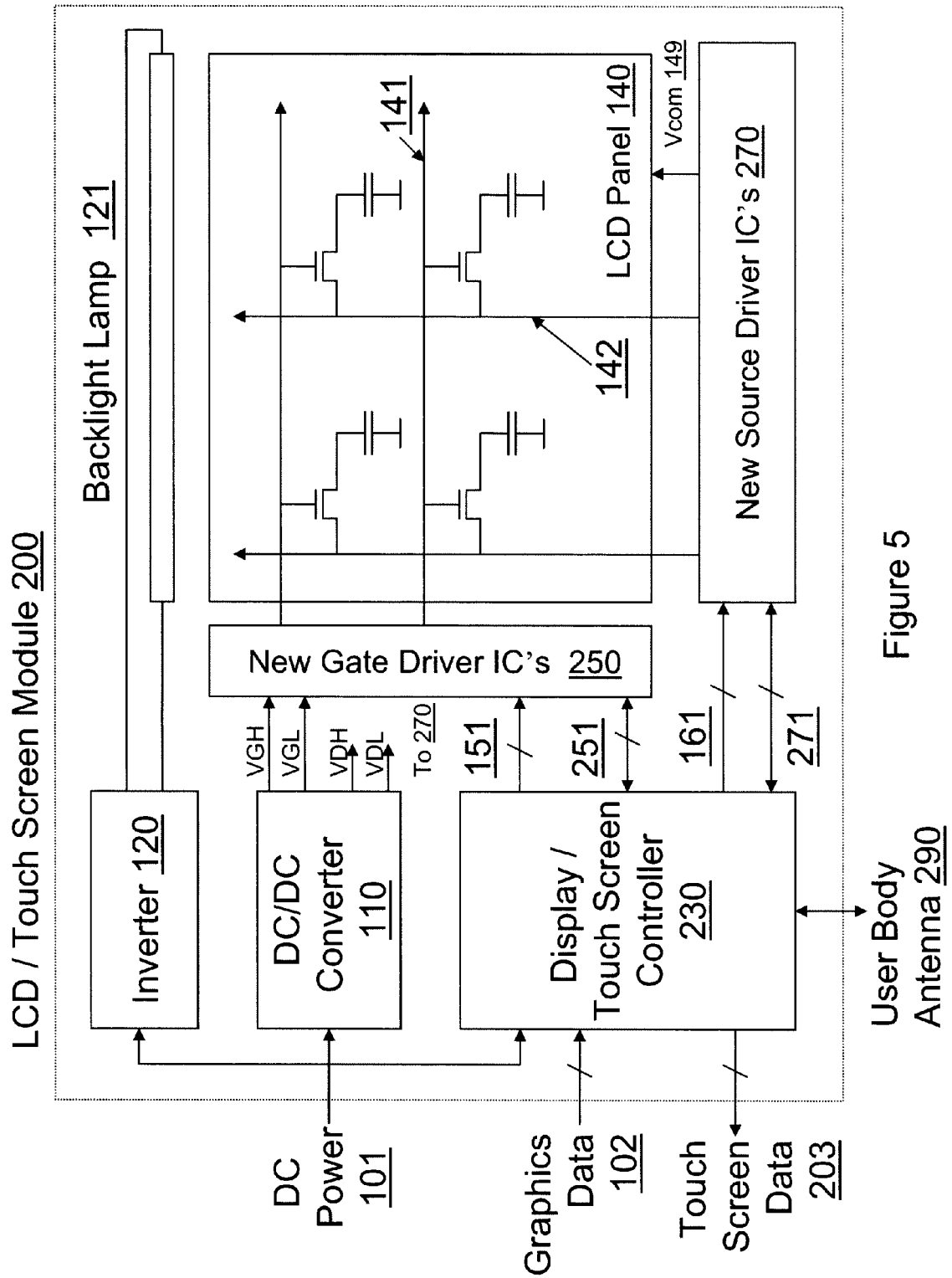
FIG. 5 illustrates an overview block diagram of an integrated LCD/touch screen panel, according to the present invention.

The RF test signal in the row line 141-y is radiated out with a small portion of this radiation picked up by an adjacent row line (141-(y+os)), and a major portion of the radiation is lost to surrounding conductive surfaces to ground, especially to the common electrode 147 in FIG. 4(b) which is made from a transparent conductive material known as ITO. ITO layers are further discussed hereinafter.

The highly attenuated RF test signal from the adjacent row line is again AC coupled into the receiving input network consisting of a receive capacitor RX Cap 262 and a load resistor RL 263. Again, other AC coupled two-port passive networks can be used to improve impedance matching at the receive antenna, in this case row line 141-(y+os). As mentioned above, the offset value can be 0 causing the transmit row line equals to the receive row line. Basically, in this mode of operation, the reflected power or reflected signal at the antenna is being measured. A touch at the top surface or at the bottom surface of the LCD panel in FIG. 4(b) can change the transmission and the reflection characteristic of the antennas, resulting in a measurable difference in the received RF test signal before and during the touch. This forms the physical basis for sensing a touch in this invention.

The received RF signal is highly attenuated due to losses to the surroundings. A highly sensitive low noise amplifier RX LNA 260 is used to amplify the attenuated RF signal and send it back to the touch screen controller as TS RX Y signal 261. Now, returning to FIG. 6, the received test signal is further amplified by a wideband programmable gain amplifier, PGA 241. An optional band-pass filter is used to remove out-of-band noise picked up by the receiving row line 141-(y+os). In this embodiment, two mixer circuits, 243 and 244 are used to demodulate the RF test signal in phase quadrature back to base-band frequencies. Two low pass filters LPF 236 and LPF 245 acting as anti-alias filters remove unwanted frequencies in the two base band signals before the two analog-to-digital converters 235 and 246 sample and convert the received quadrature signals back to digital domain for further processing by the touch screen processor 231.

The above description of the touch screen signal path is for determining the touch location in the y direction. For the x-direction sensing, the touch screen RF signal TS TX X signal 277 is sent to the new source driver IC 270 in FIG. 8. Comparing FIG. 8 to FIG. 7, one can see that the touch screen signal path in 270 is essentially identical to that of the new gate driver IC 250 which has been described in detail above and similar descriptions of the signal path in 270 are not repeated here. However, the characteristics of the column lines 142 are different from that of the row lines 141. Adjustments to component values like RS 278, 279, 282 and 283, test signal strength, test signal types, and control timing become necessary to compensate for such differences.

Period of Non-Use of the Row and Column Lines

The operation of a LCD panel requires that the row lines 141 be biased at the low level VGL most of the time. This is typically because only a single row of TFT's are turned on at any one time. As such, it is possible to send (or receive) the low-voltage touch screen test signal to these row lines most of the time. The display controller 130 and the touch screen controller 231 share timing information and synchronize its address counters such that the touch screen test signal is not send to a row line when it is being accessed by display controller 130.

Conversely, the column lines 142 are active most of the time. In order not to affect the writing of pixel data into the storage capacitor, touch screen scanning in the x direction is best performed during horizontal and vertical blanking intervals when the column lines are quiet.

Other Antenna Configurations

The above paragraphs describe the use of the preferred embodiment of this invention in a manner where the transmit antenna is parallel to the receiver antenna inside the LCD panel.

Other antenna configurations are also possible. For example, one can send the transmit RF test signal to a row line 141 via the new gate driver IC 250 and sense the received RF test signals from the column lines 142 through the new source driver IC 270, and vice versa. This way the two antennas are perpendicular to each other.

Figure 9:
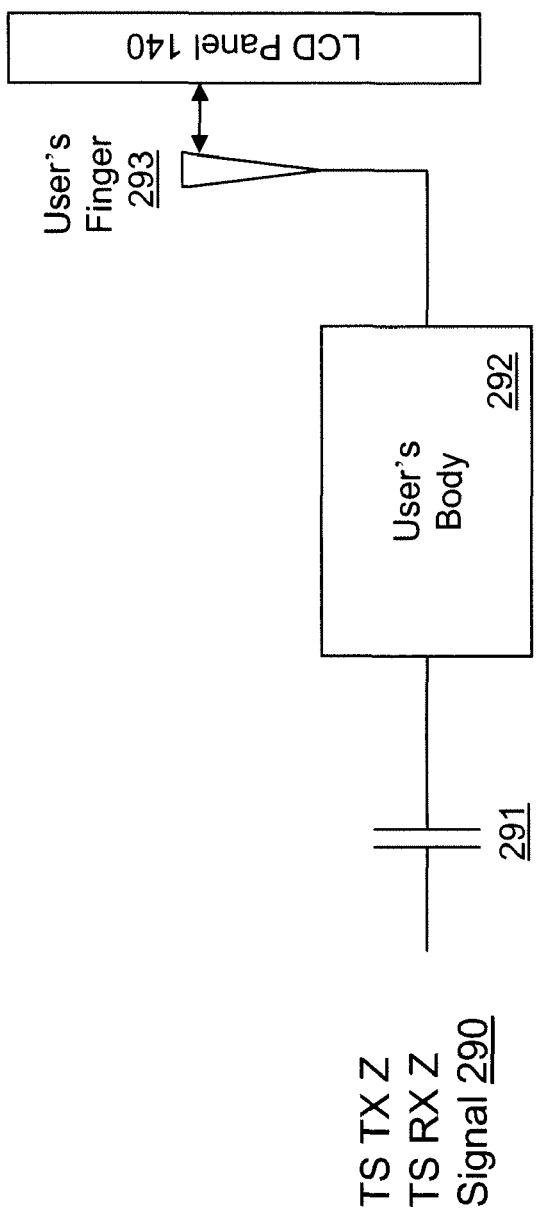
FIG. 9 illustrates the optional use of the user's body as either the transmit or the receive antenna for the RF test signal.

Another antenna configuration is to use the user's body and finger as the transmit antenna. Returning to FIG. 6, the RF test signal can be transmitted using the third programmable gain amplifier PGA 240-3, as TS TX Z signal 290 to the case of a handheld device. This RF test signal is coupled to the user's body via capacitor 291 as depicted in FIG. 9. As the finger of the user touches the screen of the handheld device, the RF signal is picked up by either the scanning row lines 141 or the scanning column lines 142 during the period of non-use. The RF test signal is then amplified by LNA 263 and LNA 286 in the new gate driver IC 250 and the new source driver IC 270, respectively. The amplified RF test signals TS RX Y 261 and TS RX X 281 are further amplified by PGA 241-1 and PGA 241-2 in the display/touch screen controller 230, before signal processing and conversion to digital domain for further analysis.

Another antenna configuration is to use the user's body and finger as the receive antenna. Returning to FIG. 6, the RF test signal can be sent during the period of non-use, as TS TX Y signal 257 and TS TX X signal 277 to the new gate driver IC 250 and to the new source driver IC 270, respectively, which in-turn is transmitted via one of the scanning row lines 141 or column lines 142 to the finger of the user which is touching the surface of the LCD panel 140. In FIG. 9, the received RF test signal is AC coupled via capacitor 291 back to the display/touch screen controller 230 as TS RX Z signal 290, and is amplified by LNA/PGA 241-3 before signal processing and conversion to digital domain for further analysis.

Single-Touch and Multi-Touch Sensing

If the screen is touched at a single location (x1,y1), it would trigger touch detection on row line y1 and column line x1 assuming the transmit antenna is parallel to the receive antenna. However, when two locations are touched simultaneously at locations (x1,y1) and (x2,y2), this would trigger touch detection on row lines y1 and y2 and column lines x1 and x2. The intersections of the four lines are (x1,y1), (x2,y2), (x1,y2) and (x2,y1) and one cannot distinguish the touch locations (x1,y2) and (x2,y1) from (x1,y1) and (x2,y2).

This ambiguity is removed if the transmit antenna is perpendicular to the receive antenna. For example, one can transmit the radio frequency touch transmit signals to each of the different row lines sequentially while receiving the transmitted signals from a single column line before moving on to the next column line. This scanning method is better suited to detect a multi-touch event.

Calibration

In summary, the method of this invention involves sending a RF test signal to one of the row or column lines, then measure the response on the same or on an adjacent line before and during the touch event. A measurable difference (before versus during) on certain functions of the received test signal determines the location of the touch. As mentioned before, if one line is used as both transmitting and receiving antenna, the reflection of the RF test signal is essentially being measured. If two adjacent lines are used, the transmission of the RF test signal across the two adjacent lines is being measured. In either configuration, these lines (both row lines 141 and column lines 142) will be referred to as transmission channels, collectively.

Upon power up of the system or on software initialization, the touch screen processor 231 initiates a calibration cycle where baseline responses on all transmission channels are measured and store into memory. Non-volatile memory can be used to store the baseline responses thus reducing the need for power up calibration.

The time available to measure one transmission channel is limited by the resolution of the touch screen system, the number of frequency measurements made per line and the touch screen's scan rate. For example, if x-resolution is 160 and y resolution is 100, measurement is made at three different frequencies per channel and scan rate is 10 Hz then scan time per channel is 128 u sec. This calculation assumes x and y scanning is possible anytime during a frame, irrespective of the limitations mentioned above. 128 u sec. is not a lot of time and implies that the frequencies of the test signal are chosen wisely. Since each transmission channel may differ from others, the optimum measurement frequencies for each channel are also different and are stored into memory during calibration. Some frequencies are better than others because a larger difference signal (compared to baseline) is generated when the LCD panel surface is touched, as will be appreciated.

Methods of Modulation/Demodulation

Different methods of modulation and demodulation applied to the touch screen test signal would result in different levels of sensitivity to the touch. The transmitter and receiver described in FIG. 6 of the preferred embodiment are designed to be very flexible and can generate many kinds of RF signals including those that are commonly use in wireless communications and those that are uncommon.

In its simplest form, when dc values are presented to the inputs of DAC's 249 and 238, a single sine wave at different frequencies can be used as the test signal. Changes in the transmission channel characteristics would result in a change in DC values at the outputs of the two A-to-D converts 235 and 246.

The frequency transfer function of each transmission channel is particular to the design of the LCD panel. Peaks and valleys in the transfer function may shift due to touching of the LCD screen at either of its two surfaces. If one wishes to detect such a shift, one can use an amplitude modulated (AM) signal where the base-band signal is a low frequency sine wave. By positioning the RF carrier at the mentioned peak or valley frequency, any shifting would result in an increase to one side tone and a decrease to the other. Such changes can be easily detected by the touch screen processor since both the in-phase and quadrature-phase demodulated signals are available to the touch screen processor in the digital domain.

This preferred embodiment of the invention only discussed two types of touch screen test signal. Other modulation and demodulation methods including phase modulation (PM), frequency modulation (FM), direct sequence (DS), pseudorandom sequence, etc. can be used with different touch sensing characteristics and it is not our intention to discuss all of these methods in detail here.

ITO Layer

The common electrode 147 of FIG. 4(b), which is made from a transparent conductive material commonly known in the industry as ITO, serves two purposes. It forms the common plate of the storage capacitors and serves as a shield to electromagnetic radiation. However, the ITO layer is resistive and is somewhat permeable to high-frequency electromagnetic waves. If the touch is at the top surface of the LCD screen 140, the ITO layer would reduce the sensitivity of the touch screen system which can be compensated with the use of highly sensitive receivers with good LNA, high-resolution ADC and narrow bandwidth noise filters.

It is notable, however, that in certain embodiments it may be advantageous to alter the ITO layer that is used on the LCD panel. Given the operations that are described herein, if openings are made in the ITO layer directly above the row and column lines, suitably small level of electromagnetic radiation can be made to penetrate the ITO layer, and would result in increase sensitivity for the touch detection. Of cause, the opening must not encroach into the pixel area, which is defined by the electrodes of the storage capacitor.

Alternatively, it may also be advantageous to reduce the thickness of the ITO layer, causing its sheet resistivity to increase, allow more electromagnetic radiation to penetrate the ITO layer, and thus improve touch sensitivity.

If the row and column lines are above the ITO layer i.e. the LCD panel is used with the TFT substrate 148 of FIG. 4(*b*) facing the touch sensing side, then the ITO layer is not a concern.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A method of obtaining a visual display of an image and detecting a touch event on an LCD panel that has a plurality of row lines and a plurality of column lines, the method comprising the steps of:
    displaying an image on the LCD panel, the step of displaying including transmitting, in a predetermined sequential manner, visual display signals along the plurality of column lines and control signals along the plurality of row lines, wherein transmitting the visual display signals and the control signals results in periods of non-use for the displaying for each of the plurality of column lines and the plurality of row lines; and
    detecting the touch event using radio frequency touch signals propagated through at least some of the plurality of row lines and at least some of the plurality of column lines, wherein the step of detecting the touch event occurs during the periods of non-use for the displaying, including the periods of non-use for the at least some of the plurality of row lines and the at least some of the plurality of column lines
    wherein the propagated radio frequency touch signals consist of radio frequency touch transmit signals and result in radio frequency touch receive signals and wherein the step of detecting includes:
        propagating the radio frequency touch signals by transmitting radio frequency touch transmit signals that originate along the at least some of the plurality of row lines and the at least some of the plurality of column lines; and
        detecting radio frequency touch receive signals received from the at least some of the plurality of row lines and the at least some of plurality of column lines.

2. The method according to claim 1 wherein the step of detecting includes monitoring the propagated radio frequency touch signals to identify a disturbance to the radio frequency touch signals indicative of the touch event.

3. The method according to claim 2 wherein the detected values include detected row values and detected column values:
    wherein one difference that exceeds a predetermined threshold between at least one of the detected row values and at least one corresponding row calibration value for radio frequency touch signals propagated along the at least some of the row lines results in a disturbed row line, and
    wherein another difference that exceeds another predetermined threshold between at least one of the detected column values and at least one corresponding column calibration value for radio frequency touch signals propagated along the at least some of the column lines results in a disturbed column line; and
    whereby an intersection of the disturbed row line and the disturbed column line indicates a location of the disturbance, and thereby the touch event on the LCD display panel.

4. The method according to claim 2 wherein the propagated radio frequency touch signals are propagated by being repeatedly transmitted at a predetermined rate so that one of the radio frequency touch signals is propagated through each of the at least some of the plurality of row lines and the at least some of the plurality of column lines during different ones of the periods of non-use.

5. The method according to claim 4 wherein at least one of the following occurs:
    each radio frequency touch transmit signal is sent to one of the plurality of row lines and is received as one of the radio frequency touch receive signals by another one of the plurality of row lines; and
    each radio frequency touch transmit signal is sent to one of the plurality of column lines and is received as one of the radio frequency touch receive signals by another one of the plurality of column lines.

6. The method according to claim 4 wherein at least one of the following occurs:
    each radio frequency touch transmit signal is sent to one of the plurality of row lines and is received as one of the radio frequency touch receive signals by one of the plurality of column lines; and
    each radio frequency touch transmit signal is sent to one of the plurality of column lines and received by one of the plurality of row lines.

7. The method according to claim 4 wherein at least one of the following occurs:
    each radio frequency touch transmit signal is sent to one of the plurality of row lines and is received as one of the radio frequency touch receive signals by the one row line; and
    each radio frequency touch transmit signal is sent to one of the plurality of column lines and is received by the one column line.

8. The method according to claim 4 wherein at least one of the following occurs:
    each radio frequency touch transmit signal is sent to a user's body and finger and is received as one of the radio frequency touch receive signals by one of the plurality of row lines; and each radio frequency touch transmit signal is sent to a user's body and finger and is received as one of the radio frequency touch receive signals by one of the plurality of column lines.

9. The method according to claim 4 wherein at least one of the following occurs:
   each radio frequency touch transmit signal is sent to one of the plurality of row lines and is received as one of the radio frequency touch receive signals by a user's finger and body; and
   each radio frequency touch transmit signal is sent to one of the plurality of column lines and is received as one of the radio frequency touch receive signals by a user's finger and body.

10. The method according to claim 1 wherein the step of propagating the radio frequency touch signals by transmitting radio frequency touch transmit signals transmits the radio frequency touch signals from a transmitter electrically coupled to the at least some of the plurality of row lines and the at least some of plurality of column lines; and wherein the step of detecting radio frequency touch receive signals receives the radio frequency touch receive signals at a detector electrically coupled to the at least some of the plurality of row lines and the at least some of plurality of column lines.

11. A method of obtaining a visual display of an image and detecting a touch event on an LCD panel that has a plurality of row lines and a plurality of column lines, the method comprising the steps of:
   displaying an image on the LCD panel, the step of displaying including transmitting, in a predetermined sequential manner, visual display signals along the plurality of column lines and control signals along the plurality of row lines;
   detecting the touch event using radio frequency touch signals propagated through at least some of the plurality of row lines and at least some of the plurality of column lines, wherein the step of detecting includes monitoring the propagated radio frequency touch signals to identify a disturbance to the radio frequency touch signals indicative of the touch event;
   initially obtaining at least one calibration value for the some of the plurality of row lines and some of the plurality of column lines by detecting a touch test signal propagated through at least one of the plurality of row lines and the plurality of column lines during a non-touch period;
   storing the at least one calibration value; and
   wherein the monitoring compares the at least one calibration value to different detected values of the radio frequency touch signals, such that the disturbance is indicated by a difference that exceeds a predetermined threshold between at least one of the detected values and the calibration value.

12. The method according to claim 11 wherein the step of initially obtaining obtains at least one row calibration value corresponding to a detected touch test row signal detected during the non-touch period on the plurality of row lines and at least one column calibration value corresponding to a detected touch test column signal detected during the non-touch period on the plurality of column lines.

13. The method according to claim 12 wherein the detected values include detected row values and detected column values:
   wherein one difference that exceeds the predetermined threshold between at least one of the detected row values and at least one corresponding row calibration value for radio frequency touch signals propagated along the at least some of the row lines results in a disturbed row line, and
   wherein another difference that exceeds the predetermined threshold between at least one of the detected column values and at least one corresponding column calibration value for radio frequency touch signals propagated along at least some of the column lines results in a disturbed column line; and
   whereby an intersection of the disturbed row line and the disturbed column line indicates a location of the disturbance, and thereby the touch event on the LCD display panel.

14. The method according to claim 11 wherein transmitting the visual display signals and the control signals results in periods of non-use for the displaying for each of the plurality of row lines and the plurality of column lines; and
   wherein the step of detecting the touch event occurs during the periods of non-use for the displaying.

15. The method according to claim 14 wherein the step of detecting the touch event occurs during the periods of non-use for at least some of the plurality of row lines and at least some of the plurality of column lines.

16. The method according to claim 14 wherein the propagated radio frequency touch signals are propagated by being repeatedly transmitted at a predetermined rate so that one of the radio frequency touch signals is propagated through each of the at least some of the plurality of row lines and the at least some of the plurality of column lines during different ones of the periods of non-use.

17. A method of obtaining a visual display of an image and detecting a touch event on an LCD panel that has a plurality of row lines and a plurality of column lines, the method comprising the steps of:
   displaying an image on the LCD panel, the step of displaying including transmitting, in a predetermined sequential manner, visual display signals along the plurality of column lines and control signals along the plurality of row lines, wherein transmitting the visual display signals and the control signals results in periods of non-use for the displaying for each of the plurality of row lines and the plurality of column lines; and
   detecting the touch event using radio frequency touch signals that are transmitted from a source inside the LCD panel and propagated through at least some of the plurality of row lines and at least some of the plurality of column lines, wherein the step of detecting the touch event occurs during the periods of non-use for the displaying, including the periods of non-use for the at least some of the plurality of row lines and the at least some of the plurality of column lines,
   wherein the propagated radio frequency touch signals are one of a sine (or cosine) signal, an arbitrary waveform signal, a combination of a sine and cosine signals, a combination of amplitude-modulated sine and cosine signals, a combination of phase-modulated sine and cosine signals, a combination of frequency-modulated since and cosine signals, a combination of pseudo-random-code modulated sine and cosine signals, and a combination of two orthogonal signals.

18. The method according to claim 17 wherein the propagated radio frequency touch signals are of one or more different frequency values for each of the plurality of row lines and for each of the plurality of column lines.

* * * * *